United States Patent
Wu (10) Patent No.: US 11,582,625 B2
(45) Date of Patent: Feb. 14, 2023

(54) METHOD AND FIRST BASE STATION FOR HANDLING SECONDARY CELL GROUP FAILURE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 7 days.

(21) Appl. No.: 16/136,275

(22) Filed: Sep. 20, 2018

(65) Prior Publication Data

US 2019/0090144 A1   Mar. 21, 2019

Related U.S. Application Data

(60) Provisional application No. 62/561,188, filed on Sep. 20, 2017.

(51) Int. Cl.
| | |
|---|---|
| *H04W 24/04* | (2009.01) |
| *H04L 5/00* | (2006.01) |
| *H04L 41/0668* | (2022.01) |
| *H04L 41/0816* | (2022.01) |
| *H04W 12/04* | (2021.01) |

(Continued)

(52) U.S. Cl.
CPC .......... *H04W 24/04* (2013.01); *H04L 5/001* (2013.01); *H04L 5/0053* (2013.01);
(Continued)

(58) Field of Classification Search
CPC . H04L 41/0668; H04L 41/0816; H04L 5/001; H04L 5/0053; H04L 5/0098;
(Continued)

(56) References Cited

U.S. PATENT DOCUMENTS

2014/0213221 A1* 7/2014 Chai ................. H04W 72/0493
455/411
2014/0335872 A1   11/2014 Yamada
(Continued)

FOREIGN PATENT DOCUMENTS

| EP | 2 675 230 A2 | 12/2013 |
|---|---|---|
| EP | 2 675 230 A3 | 10/2014 |

(Continued)

OTHER PUBLICATIONS

Search Report dated Feb. 22, 2019 for EP application No. 18195585. 7, pp. 1-6.

(Continued)

*Primary Examiner* — Omar J Ghowrwal
(74) *Attorney, Agent, or Firm* — Winston Hsu (57) ABSTRACT

A first base station (BS) transmitting a secondary node (SN) Addition Request message to a second BS for a communication device; receiving a SN Addition Request Acknowledge message from the second BS, wherein the SN Addition Request Acknowledge message comprises a first plurality of configurations which configure the communication device to communicate with the second BS and configure a data radio bearer (DRB) which is a SCG split bearer; transmitting a first message comprising the first plurality of configurations to the communication device, wherein the second BS communicates with the communication device according to the first plurality of configurations; receiving a second message indicating the SCG failure from the communication device; initiating a SN Modification procedure with the second BS to recover the SCG failure, or transmitting a third message configuring the DRB to be a master cell group bearer or a MCG split bearer to the communication device.

6 Claims, 6 Drawing Sheets

(51) Int. Cl.
*H04W 36/00* (2009.01)
*H04W 76/19* (2018.01)
*H04W 36/30* (2009.01)
*H04W 76/15* (2018.01)
*H04W 76/18* (2018.01)

(52) U.S. Cl.
CPC ........ *H04L 5/0098* (2013.01); *H04L 41/0668* (2013.01); *H04L 41/0816* (2013.01); *H04W 12/04* (2013.01); *H04W 36/0069* (2018.08); *H04W 76/19* (2018.02); *H04W 36/305* (2018.08); *H04W 76/15* (2018.02); *H04W 76/18* (2018.02)

(58) Field of Classification Search
CPC . H04W 12/04; H04W 24/04; H04W 36/0069; H04W 36/305; H04W 76/19; H04W 76/16; H04W 76/18
USPC .......................................................... 370/216
See application file for complete search history.

(56) References Cited

U.S. PATENT DOCUMENTS

| | | | |
|---|---|---|---|
| 2015/0117183 A1 | 4/2015 | Heo | |
| 2017/0055313 A1* | 2/2017 | Sharma | H04W 36/0066 |
| 2017/0086242 A1* | 3/2017 | Ahn | H04W 72/0446 |
| 2017/0127331 A1* | 5/2017 | Wu | H04W 76/27 |
| 2018/0184475 A1* | 6/2018 | Babaei | H04W 88/06 |
| 2018/0368018 A1* | 12/2018 | Kim | H04W 24/10 |
| 2020/0326952 A1* | 10/2020 | Nakanoya | G06F 11/142 |

FOREIGN PATENT DOCUMENTS

| | | |
|---|---|---|
| EP | 2 874 460 A1 | 5/2015 |
| EP | 3 051 916 A1 | 8/2016 |
| WO | 2013/117009 A1 | 8/2013 |
| WO | 2015/009075 A1 | 1/2015 |
| WO | 2015/064728 A1 | 5/2015 |

OTHER PUBLICATIONS

3GPP TS 37.340 V0.4.0 (Aug. 2017).
3GPP TS 38.331 V0.1.0 (Oct. 2017).
Office action dated Dec. 3, 2020 for EP application No. 18195585.7, pp. 1-9.
3GPP TS 37.340 V1.0.1 (Sep. 2017), "3rd Generation Partnership Project; Technical Specification Group Radio Access Network; Evolved Universal Terrestrial Radio Access (E-UTRA) and NR; Multi-connectivity; Stage 2 (Release 15)", XP051324602, pp. 1-44, Sep. 2017.

* cited by examiner

METHOD AND FIRST BASE STATION FOR HANDLING SECONDARY CELL GROUP FAILURE

CROSS REFERENCE TO RELATED APPLICATIONS

This application claims the benefit of U.S. Provisional Application No. 62/561,188 filed on Sep. 20, 2017, which is incorporated herein by reference.

BACKGROUND OF THE INVENTION

1. Field of the Invention

The present invention relates to a communication device and a method used in a wireless communication system, and more particularly, to a communication device and a method of handling a secondary cell group failure.

2. Description of the Prior Art

A secondary cell group (SCG) failure may occur, when a master node (MN) configures a user equipment (UE) to be in a dual connectivity with the MN and a secondary node (SN). However, it is unknown how to transmit data of a SCG split bearer, when the SCG failure occurs and the UE is configured to transmit the data only via the SN. Thus, how to handle the SCG failure in the DC is an important problem to be solved.

SUMMARY OF THE INVENTION

The present invention therefore provides a method and related communication device for handling a secondary cell group failure to solve the abovementioned problem.

A first base station (BS) connecting to a communication device; transmitting a secondary node (SN) Addition Request message to a second BS for the communication device; receiving a SN Addition Request Acknowledge message in response to the SN Addition Request message from the second BS, wherein the SN Addition Request Acknowledge message comprises a first plurality of configurations which configure the communication device to communicate with the second BS and configure a data radio bearer (DRB) which is a SCG split bearer; transmitting a first message comprising the first plurality of configurations to the communication device, wherein the second BS communicates with the communication device according to the first plurality of configurations; receiving a second message indicating the SCG failure from the communication device; and initiating a SN Modification procedure with the second BS to recover the SCG failure, or transmitting a third message configuring the DRB to be a master cell group (MCG) bearer or a MCG split bearer to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
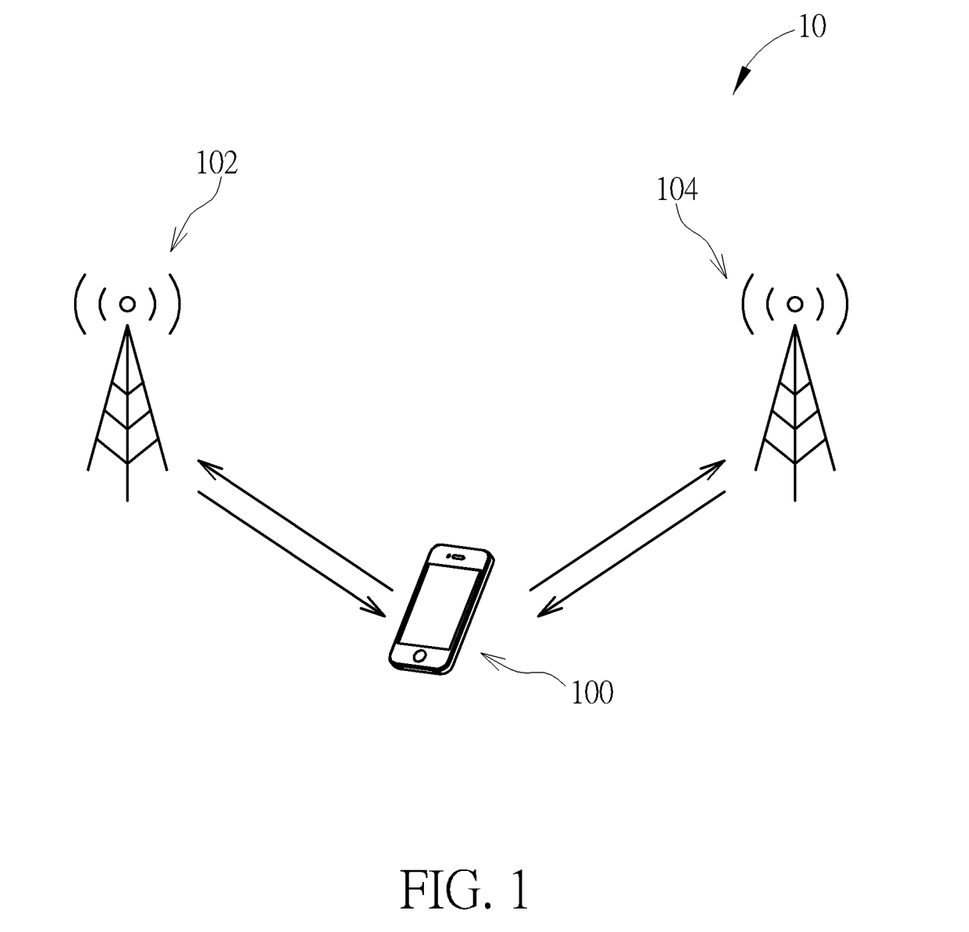
FIG. 1 is a schematic diagram of a wireless communication system according to an example of the present invention.

As shown in FIG. 1, the wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10. The communication device 100 may be configured to simultaneously connect to the BSs 102 and 104 (i.e., dual connectivity (DC)). That is, the communication device 100 in the DC may perform transmissions or receptions via the BSs 102 and 104. For example, the communication device 100 may receive packets from the BS 102 at a first carrier frequency or from the BS 104 at a second carrier frequency, or the communication device 100 may transmit packets to the BS 102 at a first carrier frequency or to the BS 104 at a second carrier frequency. In addition, one of the BSs 102 and 104 may be a master node (MN) and the other BS may be a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
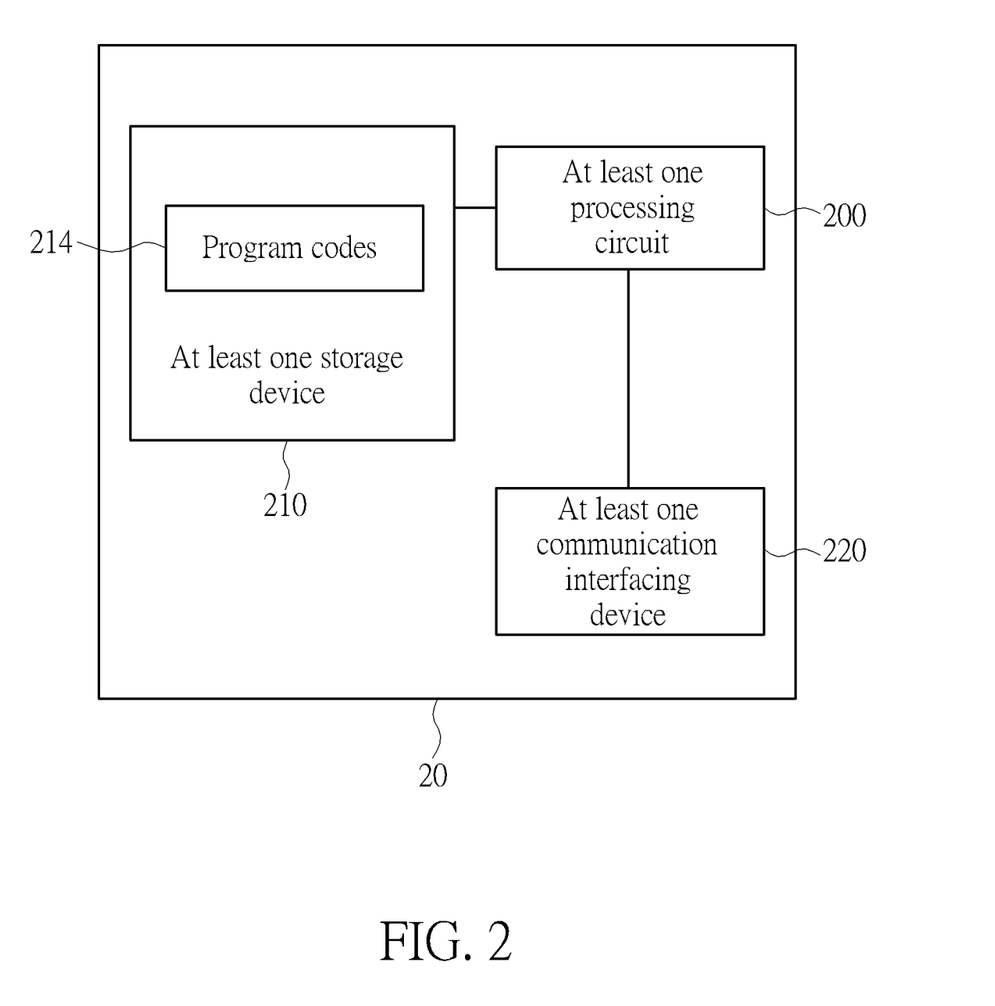
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as microprocessor or Application Specific Integrated Circuit(s) (ASIC(s)), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
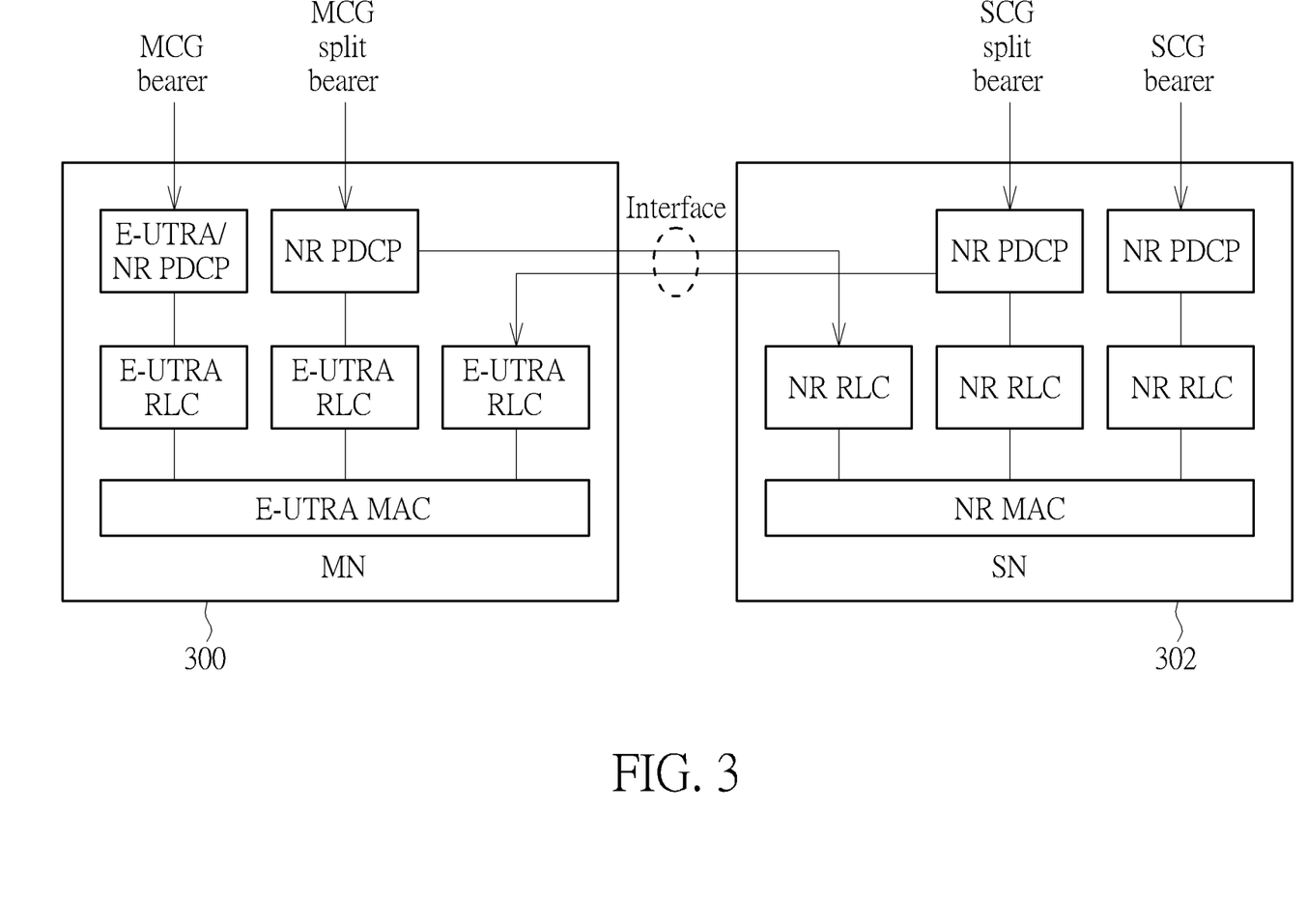
FIG. 3 is a schematic diagram of a radio protocol architecture according to an example of the present invention.

FIG. 3 is a schematic diagram of a radio protocol architecture 30 according to an example of the present invention. The radio protocol architecture 30 may be used for illustrating the use of a master cell group (MCG) bearer, a secondary cell group (SCG) bearer, a MCG split bearer and a SCG split bearer in a dual connectivity (DC) for a MN 300 and a SN 302. The MN 300 and the SN 302 are connected via an interface (e.g., the ellipse shown in FIG. 3). For example, the interface is X2 or Xn. In the DC, the MCG bearer may utilize radio protocols located at the MN 300 (e.g., an evolved universal terrestrial radio access (E-UTRA)/new radio (NR) Packet Data Convergence Protocol (PDCP) 3000, an E-UTRA radio link control (RLC) 3002 and an E-UTRA medium access control (MAC) 3004), to use radio resources (e.g., time and frequency resources) of the MN 300. The SCG bearer may utilize radio protocols located at the SN 302 (e.g., a NR PDCP 3020, a NR RLC 3022 and an NR MAC 3024), to use radio resources of the SN 302.

The MCG split bearer and the SCG split bearer can utilize protocols and radio resources located at the MN 300, the SN 302 or both the MN 300 and the SN 302. A data radio bearer (DRB) may be configured as the MCG bearer, the SCG bearer, the MCG split bearer or the SCG split bearer. A signalling radio bearer (SRB) may be configured as the MCG bearer, the MCG split bearer or the SCG split bearer.

The MN 300 configures a radio resource control (RRC) connection to a UE, and the MN 300/the SN 302 configures the DRB as the SCG split bearer to the UE. The UE communicates (e.g., transmits or receives) a plurality of protocol data units (PDUs) with (e.g., to or from) the SN 302 via the MN 300 or via the SN 302, wherein each of the plurality of PDUs includes a service data unit (SDU) of (or associated to) the DRB.

Figure 4:
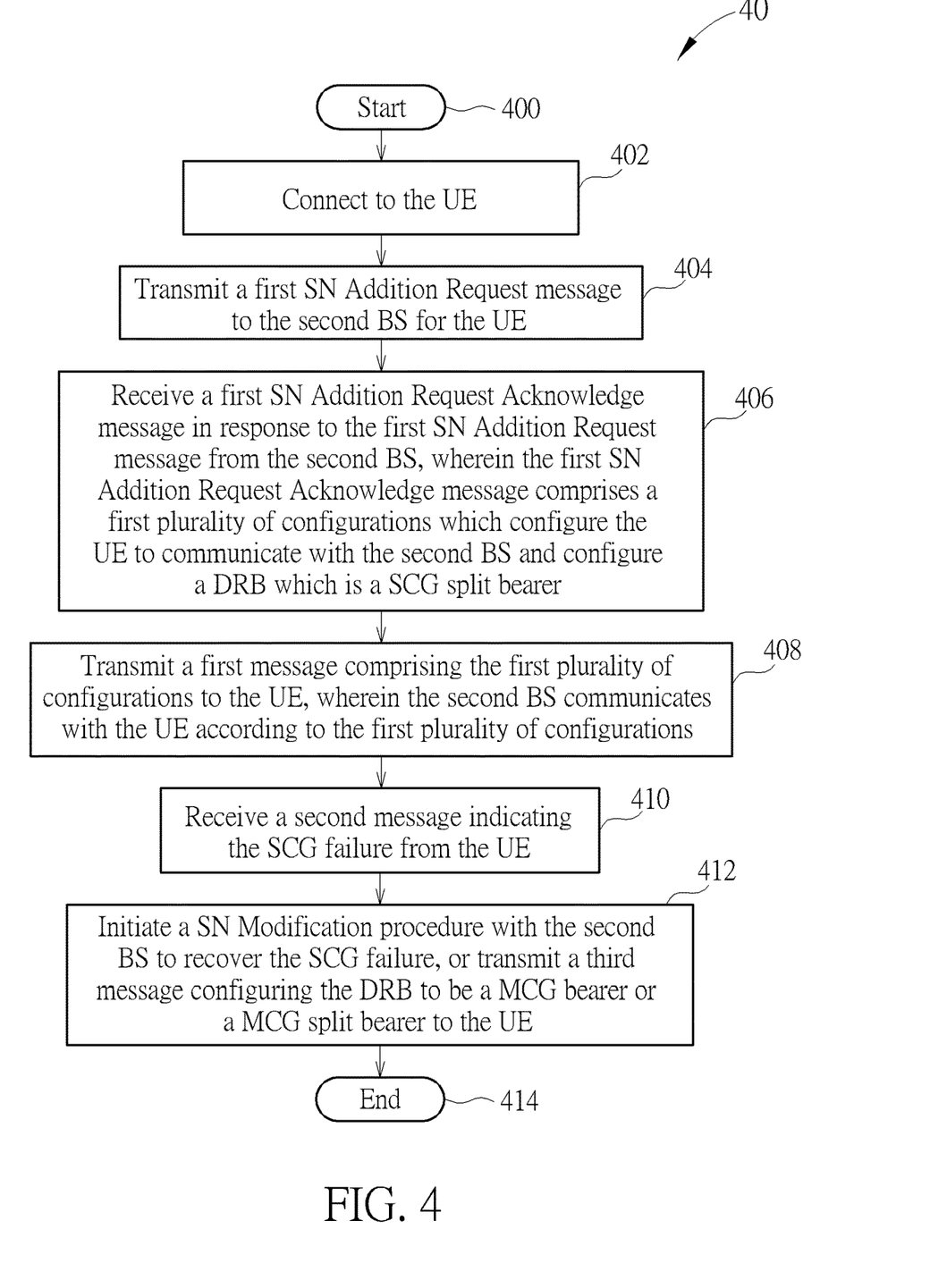
FIG. 4 is a flowchart of a process according to an example of the present invention.

A process 40 in FIG. 4 is utilized in a first BS (e.g., the BS 102) for configuring a UE to be in a DC with the first BS and a second BS (e.g., the BS 104), and includes the following steps:

Step 400: Start.
Step 402: Connect to the UE.
Step 404: Transmit a first SN Addition Request message to the second BS for the UE.
Step 406: Receive a first SN Addition Request Acknowledge message in response to the first SN Addition Request message from the second BS, wherein the first SN Addition Request Acknowledge message comprises a first plurality of configurations which configure the UE to communicate with the second BS and configure a DRB which is a SCG split bearer.
Step 408: Transmit a first message comprising the first plurality of configurations to the UE, wherein the second BS communicates with the UE according to the first plurality of configurations.
Step 410: Receive a second message indicating the SCG failure from the UE.
Step 412: Initiate a SN Modification procedure with the second BS to recover the SCG failure, or transmit a third message configuring the DRB to be a MCG bearer or a MCG split bearer to the UE.
Step 414: End.

If the first BS initiates the SN Modification procedure at step 412, the UE communicates (e.g., transmits or receives) SDUs of the DRB which is the SCG split bearer with (e.g., to or from) the second BS via SCG transmissions (i.e., radio resources of the second BS), when the SCG failure is recovered in response to the SN Modification procedure.

If the first BS transmits the third message at Step 412, the UE communicates (e.g., transmits or receives) SDUs of the DRB which is the MCG bearer or the MCG split bearer with (e.g., to or from) the first BS via MCG transmissions (i.e., radio resources of the first BS), when the DRB is configured to be the MCG bearer or the MCG split bearer. That is, the UE changes (e.g., switches) to communicate with the first BS via the MCG transmissions instead of communicate with the second BS via the SCG transmissions.

In one example, the first SN Addition Request Acknowledge message configures (e.g., restricts) the UE to transmit all SDUs associated with the SCG split bearer to the second BS via the SCG transmissions but not to the first BS via the MCG transmissions.

In one example, the first BS receives a response message for responding to the third message from the UE.

Figure 5:
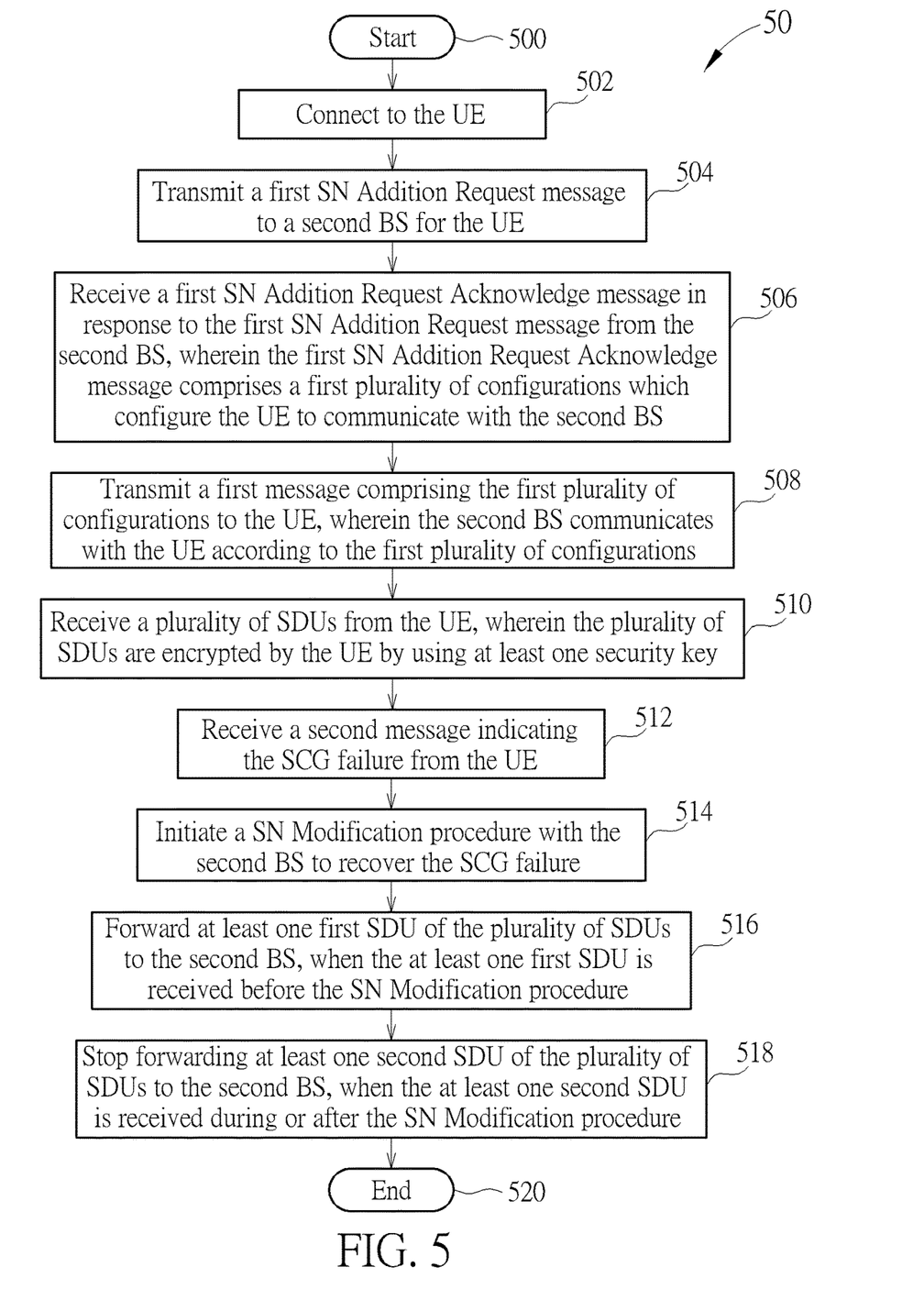
FIG. 5 is a flowchart of a process according to an example of the present invention.

A process 50 in FIG. 5 is utilized in a first BS (e.g., the BS 102) for configuring a UE to be in a DC with the first BS and a second BS (e.g., the BS 104), and includes the following steps:

Step 500: Start.
Step 502: Connect to the UE.
Step 504: Transmit a first SN Addition Request message to a second BS for the UE.
Step 506: Receive a first SN Addition Request Acknowledge message in response to the first SN Addition Request message from the second BS, wherein the first SN Addition Request Acknowledge message comprises a first plurality of configurations which configure the UE to communicate with the second BS.
Step 508: Transmit a first message comprising the first plurality of configurations to the UE, wherein the second BS communicates with the UE according to the first plurality of configurations.
Step 510: Receive a plurality of SDUs from the UE, wherein the plurality of SDUs are encrypted by the UE by using at least one security key.
Step 512: Receive a second message indicating the SCG failure from the UE.
Step 514: Initiate a SN Modification procedure with the second BS to recover the SCG failure.
Step 516: Forward at least one first SDU of the plurality of SDUs to the second BS, when the at least one first SDU is received before the SN Modification procedure.
Step 518: Stop forwarding at least one second SDU of the plurality of SDUs to the second BS, when the at least one second SDU is received during or after the SN Modification procedure.
Step 520: End.

In one example, the first BS (i.e., as a MN) configures a RRC connection to the UE, and the second BS (i.e., as a SN) configures a DRB which is a SCG split bearer to the UE. The UE may transmit a first plurality of SDUs to the SN via MCG transmissions (i.e., via the MN) or SCG transmissions, wherein the first plurality of SDUs are encrypted by at least one security key and associated to the DRB. The UE suspends SCG transmissions for the DRB and transmits a SCG Failure Information message to the MN instead of triggering a reestablishment, upon the SCG failure is detected by the UE. During the SCG failure, the UE transmits at least one SDU associated to the DRB to the first BS via MCG transmissions since the UE does not detect a MCG failure on radio link (s) with the first BS. In response to/according to the SCG Failure Information message, the first BS decides to keep or change the SN for the UE. In response to the decision, the first BS initiates a SN Modification procedure with the second BS or a SN change procedure with a third BS (i.e., as the SN) to recover the SCG failure. The first BS transmits a RRC message (e.g., RRC Connection Reconfiguration message) indicating a SCG change to the UE, according to the SN Modification procedure or the SN change procedure. The UE derives at least one new security key in response to/according to the RRC message and transmit a RRC response message to the first BS in response to the RRC message. Correspondingly, the second BS (i.e., the SN is kept)/the third BS (i.e., the third BS replaces the second BS as the SN for the UE) derives at least one new security key in response to the SN Modification procedure or the SN change procedure. The at least one new security key derived by the second/third BS is the same as the at least one new security key derived by the UE. If the second/third BS receives a SDU of the first plurality of SDUs forwarded during/after the SN Modification procedure or the SN change procedure, the second/third BS decrypts the SDU by using the at least one new security key. However, the SDU is encrypted by the UE using the at least one security key. Therefore, it causes a problem that the second/third BS cannot correctly decrypt the SDU. According to the process 50, the first BS does not forward the SDU to the second/third BS and solves the problem. The first BS may receive a second plurality of SDUs associated to the DRB after receiving the RRC response message and forward the second plurality of SDUs to the second/third BS.

Figure 6:
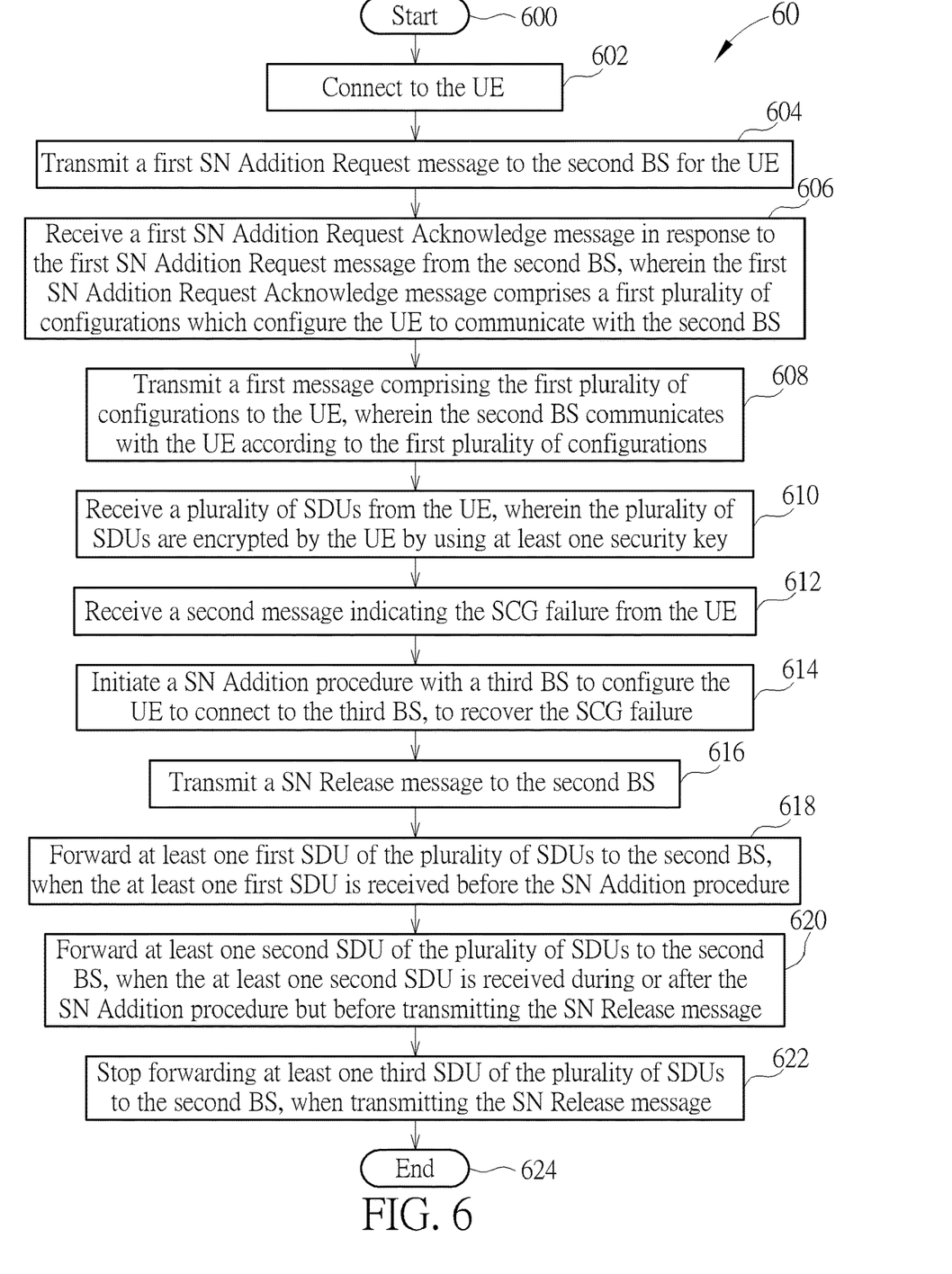
FIG. 6 is a flowchart of a process according to an example of the present invention.

A process 60 in FIG. 6 is utilized in a first BS (e.g., the BS 102) for configuring a UE to be in a DC with the first BS and a second BS (e.g., the BS 104), and includes the following steps:

Step 600: Start.

Step 602-612: Same as Steps 502-512.

Step 614: Initiate a SN Addition procedure with a third BS to configure the UE to connect to the third BS, to recover the SCG failure.

Step 616: Transmit a SN Release message to the second BS.

Step 618: Forward at least one first SDU of the plurality of SDUs to the second BS, when the at least one first SDU is received before the SN Addition procedure.

Step 620: Forward at least one second SDU of the plurality of SDUs to the second BS, when the at least one second SDU is received during or after the SN Addition procedure but before transmitting the SN Release message.

Step 622: Stop forwarding at least one third SDU of the plurality of SDUs to the second BS, when transmitting the SN Release message.

Step 624: End.

In one example, the first BS initiates the SN Addition procedure by transmitting a second SN Addition Request message to the third BS. In one example, the first BS receives a second SN Addition Request Acknowledge message in response to the second SN Addition Request message from the third BS. The second SN Addition Request Acknowledge message includes a second plurality of configurations which configure the UE to communicate with the third BS. In one example, the first BS transmits a third message including the second plurality of configurations to the UE. The third BS communicates with the UE according to the second plurality of configurations.

The following examples may be applied to the processes 40-60.

In one example, the first BS configures a first SRB to the UE. The first BS transmits the first/third message to the UE on the first SRB. In one example, the first BS receives a first/third response message for responding to the first/third message from the UE on the first SRB. In one example, the first BS receives the second message from the UE on the first SRB.

The first/third message may be a first/third RRC message (e.g., RRC Connection Reconfiguration message), and the first/third response message may be a first/third RRC response message (e.g., RRC Connection Reconfiguration Complete message). The second message may be a second RRC message (e.g., SCG Failure Information message). In one example, the first BS generates the first/third message.

In one example, the second BS generates a fourth RRC message including the first plurality of configurations, and includes the fourth RRC message in the first SN Addition Request Acknowledge message. In one example, the first BS includes the fourth RRC message in the first RRC message. The first RRC response message may include a fourth RRC response message for responding the fourth RRC message. In one example, the first BS forwards the fourth RRC response message to the second BS.

In one example, the third BS generates a fifth RRC message including the second plurality of configurations, and includes the fifth RRC message in the second SN Addition Request Acknowledge message. In one example, the first BS includes the fifth RRC message in the third RRC message. The third RRC response message may include a fifth RRC response message for responding the fifth RRC message. In one example, the first BS forwards the fifth RRC response message to the third BS.

In one example, the UE transmits transmissions to the second BS, and receives transmissions from the second BS, according to the first plurality of configurations. In one example, the second BS transmits transmissions to the UE, and receives transmissions from the UE, according to the first plurality of configurations.

The first/second plurality of configurations may include at least one of a frame/slot structure configuration, a subcarrier spacing configuration, a physical cell identity, carrier information, a temporary identifier (e.g., Cell Radio Network Temporary Identifier (C-RNTI)) assigned to the UE, a physical layer configuration (e.g., for physical channel(s), a transmission mode, a reference signal, a channel state information reporting, etc.), a carrier aggregation (CA) configuration (e.g., SCellToAddModList), a MAC configuration, a RLC configuration, a PDCP configuration and at least one radio bearer (RB) configuration. The at least one RB configuration may include a SRB configuration configuring a second SRB and/or a DRB configuration configuring a DRB. The DRB configuration may include a RB identity identifying the DRB. Any SDU described above is associated to the DRB. The DRB may be a SCG split bearer.

In one example, the first SRB is a MCG bearer or a MCG split bearer. The second SRB may be a SCG bearer or a SCG split bearer. In one example, the first SRB is SRB1 which is the MCG bearer or the MCG split bearer. The second SRB may be SRB3 which is the SCG bearer or the SCG split bearer.

In one example, the first BS initiates the SN Modification procedure by transmitting a SN Modification Request message to the second BS. In one example, the first BS receives a SN Modification Request Acknowledge message in response to the SN Modification Request message from the second BS. The SN Modification Request Acknowledge message may include a third plurality of configurations. In one example, the first BS transmits a sixth RRC message (e.g., RRC Connection Reconfiguration message) including the third plurality of configurations to the UE on the first SRB, and receives a sixth RRC response message (e.g., RRC Connection Reconfiguration Complete message) from the UE on the first SRB.

In one example, the UE sets up the first SRB in response to a RRC connection establishment procedure. In one example, the UE performs the RRC connection establishment procedure by transmitting a RRC Connection Request message to the first BS. In one example, the first BS transmits a RRC Connection Setup message configuring the first SRB to the UE, in response to the RRC Connection Request message.

In one example, the UE sets up the first SRB in response to a RRC connection resume procedure. In one example, the UE performs the RRC connection resume procedure by transmitting a RRC Connection Resume Request message to the first BS. In one example, the first BS transmits a RRC Connection Resume message configuring the first SRB to the UE, in response to the RRC Connection Resume Request message.

In one example, the UE sets up the first SRB in response to a handover procedure. In one example, the UE performs the handover procedure by receiving a RRC Connection Reconfiguration message from a fourth BS. In one example, the UE transmits a RRC Connection Reconfiguration Complete message to the first BS on the first SRB, in response to the RRC Connection Reconfiguration message.

In one example, the UE sets up the second SRB in response to the first message. That is, the first message configures the second SRB.

In one example, the first BS is a MN, and the second BS is a SN. The first BS may be an eNB or a gNB, and the second BS may be an eNB or a gNB. The "MN" above may be replaced by a "MeNB" or a "MgNB", and the "SN" above may be replaced by a "SgNB" or a "SeNB". In one example, the "SN" above may be replaced by a "S-Node".

"SCG failure" may also be termed as "SN failure". The SN failure includes a SN radio link failure (RLF), a SN change failure, a SN configuration failure (e.g., only for messages on SRB3), and/or a SN RRC integrity check failure.

In the SN failure described above, the UE maintains measurement configuration(s) received from the first BS and/or the second BS. The first/second BS also maintains the measurement configuration (s). The UE may continue performing measurements according to a first measurement configuration received from the first BS and/or a second measurement configuration received from the second BS. A second measurement result of the second BS configured to be routed via the first BS may continue to be reported after the SN failure.

In one example, the UE includes the SCG Failure Information message in a first measurement result of the first BS and the second measurement result available according to the first measurement configuration and the second measurement configuration.

In one example, the UE determines to release or maintain/keep the second measurement configuration according to a characteristic of the second measurement configuration. In one example, the second BS determines to release or maintain/keep the second measurement configuration according to the characteristic of the second measurement configuration. For example, the characteristic may be a periodic reporting configured in the second measurement configuration. In one example, the UE/the second BS determines to release the second measurement configuration, when the second measurement configuration configures the periodic reporting. In one example, the UE/the second BS determines to maintain/keep the second measurement configuration. For example, the characteristic may be an event type. In one example, the UE/the second BS determines to release the second measurement configuration, when the second measurement configuration configures a first event for an event-triggered reporting. In one example, the UE/second BS determines to maintain/keep the second measurement configuration, when the second measurement configuration configures a second event for an event-triggered reporting.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process (es) involving the first BS, the steps performed by the first BS may be compiled into the program codes 214 of the first BS.

To sum up, the present invention provides a method and related communication device for handling a SCG failure. A MN recovers the SCG failure, or configures a DRB which is a SCG split bearer to be a MCG bearer or a MCG split bearer. Accordingly, the UE knows how to transmit data associated with the DRB. Thus, the problem of handling the SCG failure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a secondary cell group (SCG) failure, comprising:
   at least one storage device; and
   at least one processing circuit, coupled to the at least one storage device, wherein the at least one storage device stores, and the at least one processing circuit is configured to execute instructions of:
   connecting to a communication device;
   transmitting a secondary node (SN) Addition Request message to a second BS for the communication device;
   receiving an SN Addition Request Acknowledge message in response to the SN Addition Request message from the second BS, wherein the SN Addition Request Acknowledge message comprises a first plurality of configurations which configure the communication device to communicate with the second BS and configure a data radio bearer (DRB) which is an SCG split bearer;
   transmitting a first message comprising the first plurality of configurations to the communication device, wherein the second BS communicates with the communication device according to the first plurality of configurations;
   receiving a second message indicating the SCG failure from the communication device; and
   initiating an SN Modification procedure with the second BS by transmitting a SN Modification Request message to the second BS to recover the SCG failure.

2. The first BS of claim 1, wherein the instructions further comprise:

transmitting the first message to the communication device on a signaling radio bearer (SRB), wherein the SRB is configured by the first BS to the communication device; and receiving a response message for responding to the first message from the communication device on the first SRB.

3. The first BS of claim 1, wherein the instructions further comprise:

receiving an SN Modification Request Acknowledge message in response to the SN Modification Request message from the second BS, wherein the SN Modification Request Acknowledge message comprises a second plurality of configurations; and transmitting a third message comprising the second plurality of configurations to the communication device.

4. A method of handling a secondary cell group (SCG) failure for a first base station (BS), comprising:

connecting to a communication device;

transmitting a secondary node (SN) Addition Request message to a second BS for the communication device;

receiving an SN Addition Request Acknowledge message in response to the SN Addition Request message from the second BS, wherein the SN Addition Request Acknowledge message comprises a first plurality of configurations which configure the communication device to communicate with the second BS and configure a data radio bearer (DRB) which is an SCG split bearer;

transmitting a first message comprising the first plurality of configurations to the communication device, wherein the second BS communicates with the communication device according to the first plurality of configurations;

receiving a second message indicating the SCG failure from the communication device; and initiating an SN Modification procedure with the second BS by transmitting a SN Modification Request message to the second BS to recover the SCG failure.

5. The method of claim 4, further comprising:

transmitting the first message to the communication device on a signaling radio bearer (SRB), wherein the SRB is configured by the first BS to the communication device; and receiving a response message for responding to the first message from the communication device on the first SRB.

6. The method of claim 4, further comprising:

receiving an SN Modification Request Acknowledge message in response to the SN Modification Request message from the second BS, wherein the SN Modification Request Acknowledge message comprises a second plurality of configurations; and transmitting a third message comprising the second plurality of configurations to the communication device.

* * * * *